United States Patent [19]
Oksman et al.

[11] Patent Number: 5,233,436
[45] Date of Patent: Aug. 3, 1993

[54] OPTICAL FILTER SOFTWARE COPY PROTECTION

[76] Inventors: Henry C. Oksman, 20 Wagon Wheel Rd., Mamaroneck, N.Y. 10543; Joseph Eisner, 185 E. 85th St., New York, N.Y. 10028; Moshe Zangilbaf, 153-58 77th Ave., Kew Garden Hills, N.Y. 11367

[21] Appl. No.: 709,335
[22] Filed: Jun. 3, 1991
[51] Int. Cl.$^5$ .............................................. H04N 5/92
[52] U.S. Cl. ................................. 358/335; 380/54; 358/253
[58] Field of Search ............... 358/335, 342, 142, 250, 358/253; 360/33.1; 340/734; 395/128, 133; 380/54

[56] References Cited

U.S. PATENT DOCUMENTS

| | | | |
|---|---|---|---|
| 2,832,821 | 4/1958 | Du Mont | 358/253 |
| 2,914,603 | 11/1959 | Gabriel | 380/54 |
| 3,561,850 | 2/1971 | Shaffer | 358/253 |
| 3,657,474 | 4/1972 | Turnrose | 358/253 |
| 4,776,013 | 10/1988 | Kafri et al. | 380/54 |
| 4,821,321 | 4/1989 | Bramley | 380/54 |

Primary Examiner—Donald E. McElheny, Jr.
Attorney, Agent, or Firm—Fiddler, Levine & Mandelbaum

[57] ABSTRACT

An interactive video system has a video display for displaying camouflaged information which is discernible only when viewed through a partially transparent viewing screen having zones with light transmission characteristics corresponding to the characteristic of respective displayed image regions. The user of the system is required to input information which can be derived only by recognizing the camouflaged information with the aid of the screen.

12 Claims, 2 Drawing Sheets

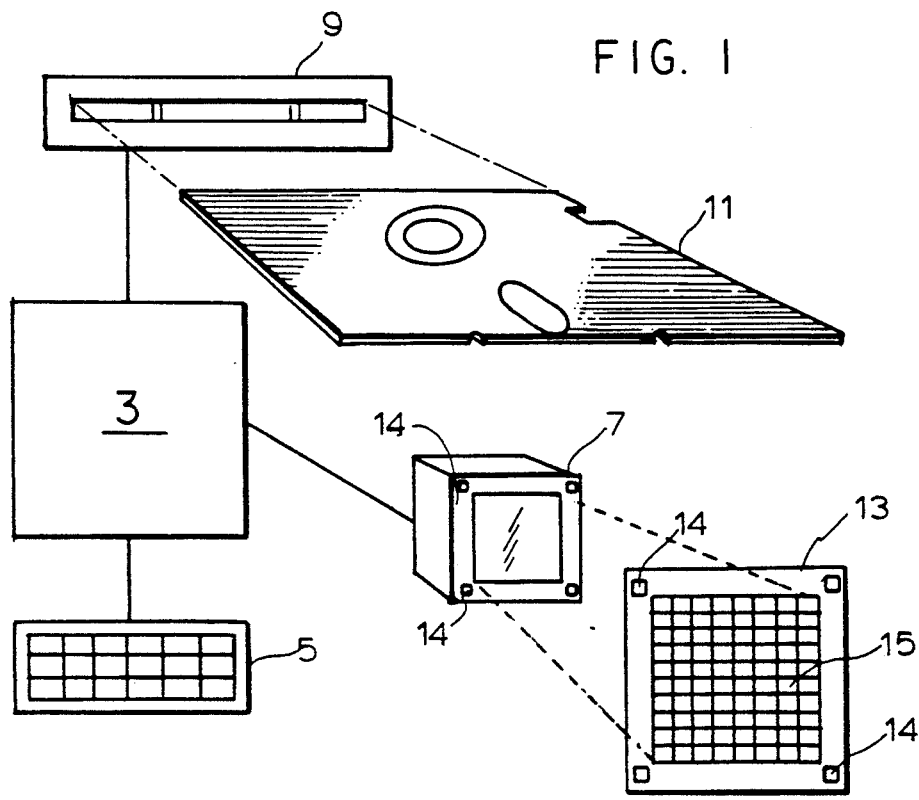
FIG. 1
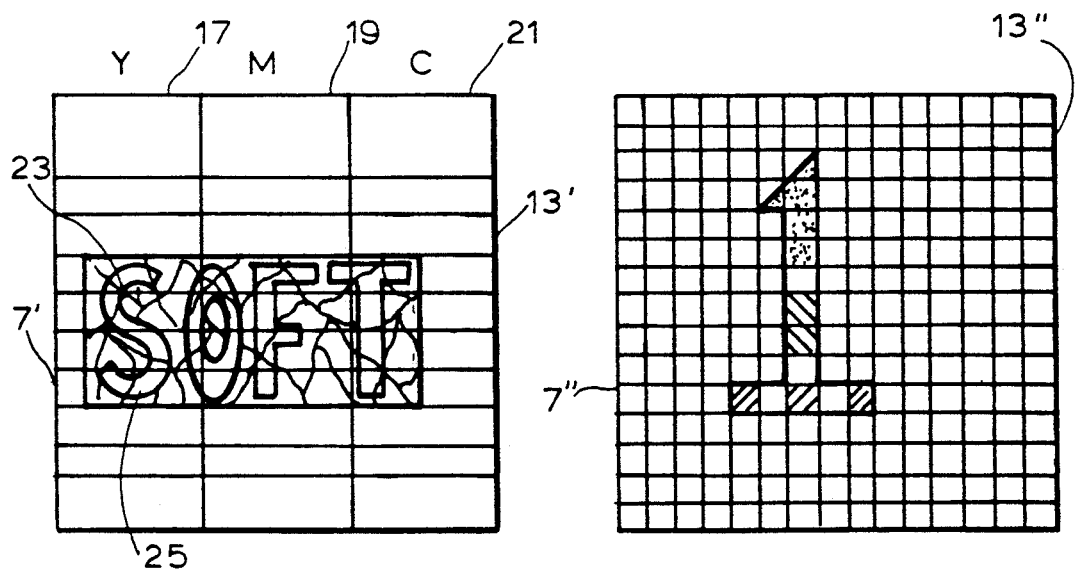
FIG. 2
FIG. 3

OPTICAL FILTER SOFTWARE COPY PROTECTION

BACKGROUND OF THE INVENTION

The problem of unlawful copying of copyrighted computer software has plagued software publishers since the commencement of distribution of software on magnetic media, e.g., floppy disks. Personal computers, which are routinely equipped with the necessary peripherals to read and write floppy disks and software to enable copying the indicia stored on one floppy disk to another floppy disk or a fixed disk, are generally all that is needed to copy software in the form of executable computer programs stored on floppy disks.

The industry has tried several schemes to thwart unlawful copying. In one group of schemes, at least part of the software is stored on the disk by arranging the indicia in nonstandard sectors which standard copy software and/or disk reading devices are unable to reproduce. In another group of such schemes, the floppy disk on which the software is stored is physically altered at predetermined regions, e.g., by burning holes in the magnetic coating, or the magnetism of the coating is weakened at predetermined regions. Unfortunately, the foregoing schemes have often made the software more problematic and difficult to use. Legitimate copying by lawful owners for backup purposes has also been made difficult if not impossible, often leaving the owners with useless disks for which they have paid large sums.

Another protection scheme tries to make a program operable on only one computer. This scheme requires that a unique readable device, e.g., a ROM chip, be installed in a personal computer before the software, which includes a program to read an identity code stored in the ROM, will function on the machine. This is a costly and unpopular proposition insofar as it requires that all PCs be fitted with a ROM, at a standard address, having an assigned code unique to the PC to which it is connected. This requires the mutual cooperation of virtually all PC manufacturers, many of whom are understandably unwilling to increase their costs and prices in the absence of any perceivable economic benefit.

Similar problems with copying have been encountered by publishers and distributors of motion pictures recorded on video tape cassettes. Weakened synchronization signals intended to cross the threshold from adequate in legitimate copies to insufficient, in unauthorized copies, are also troublesome in that the legitimate copies sometimes exhibit the symptoms intended for the unauthorized ones.

SUMMARY OF THE INVENTION

The aforementioned problems are overcome by the instant invention in which there is provided an interactive system having a central processing means, a machine readable medium on which there are stored indicia of information, a reading means operatively connected and responsive to the central processing means and the machine readable medium for converting the indicia into video signals, a video display operatively connected to the central processing means for displaying the information, an input means operatively connected to the central processing means, the video display being additionally responsive to the input means, a partially transparent viewing screen having first and second laterally displaced zones, the first zone having a light transmission characteristic with a magnitude different from the magnitude of the light transmission characteristic in the second zone, and complementary indexing means on the video display and the viewing screen for fixedly positioning the viewing screen with respect to the video display with at least part of each of the zones covering the video display for enabling viewing of a first predetermined region of the video display through the first zone of the viewing screen and a second predetermined region of the video display through the second zone of the viewing screen, the machine readable medium indicia being related to the disposition of the first and second zones on the viewing filter for enhancing the perceived contrast between a foreground image displayed by the video display and viewed after transmission through the viewing screen relative to its surrounding background. The light characteristic can be frequency or intensity and the first and second zones can be of different colors and/or optical densities. The image can be of an object, text, groups of text, or a plurality of symbols.

It is therefore an object of the invention to provide an apparatus and method for enabling only the legitimate possessor of a copy of recorded visual information to display the information in an intelligible form.

Another object of the invention is to provide an apparatus and method for selectively camouflaging a display of visual information recorded on a medium and rendering the information intelligible on the display only by an authorized possessor of the medium.

Still another object of the invention is to provide an apparatus and method for limiting use of visual information recorded on a medium to an authorized possessor of the medium without comprising compatibility between the medium and the display device.

Still a further object of the invention is to provide an apparatus and method for viewing a video display o which foreground images are presented in predetermined colors and/or intensities at predetermined locations related to the color characteristics of a viewing filter.

Other and further objects of the invention will be apparent from the following drawings and description of a preferred embodiment of the invention in which like reference numerals are used to indicate like parts in the various views.

DESCRIPTION OF THE DRAWINGS

FIG. 1 is a view of a schematic block diagram of the apparatus of the preferred embodiments of the invention.

FIG. 2 is a plan view of a part of the apparatus of a first preferred embodiment of the invention.

FIG. 3 is a plan view of a part of the apparatus of a second preferred embodiment of the invention.

DESCRIPTION OF THE PREFERRED EMBODIMENTS

Figure 5:
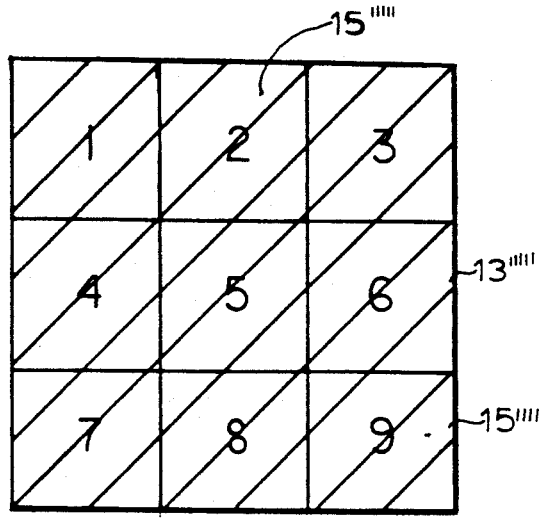
FIG. 5 is a plan view of a part of the apparatus of a fourth preferred embodiment of the invention.

Referring now to the drawings, in FIG. 1 there is shown a personal computer arrangement which provides a suitable environment for the apparatus and method of the preferred embodiment of the invention. The personal computer 1 includes a central processing unit 3 (CPU) which has a microprocessor, a read-only memory (ROM) for storing dedicated hardware operational instructions, and a random access memory (RAM) for temporary storage of program instructions and input and output data for use by the microprocessor or a direct memory addressing (DMA) processor.

Connected to the CPU 3 are a keyboard 5 for user input to the CPU and a monitor 7 having a video display for displaying data output from the CPU 3. The display device employed in the monitor 7 can be a cathode ray tube (CRT), liquid crystal display (LCD), plasma tube, or any other similar device adapted to present visually discernible data. It is preferable that the display device be capable of presenting data in color. However, even a monochrome monitor can be used within the teachings of the invention as will be shown below.

Also connected to the CPU 3 for input and output is a floppy disk drive 9 adapted to receive a floppy diskette 11 and to read digitally encoded data from the diskette surface. Although the preferred embodiments of the invention will be described with reference to the use of a floppy diskette 11 for recording program instructions, it is to be understood that any other suitable medium for inputting stored program instructions to the CPU 3 can be utilized, e.g., a hard or fixed disk, magnetic tape, optical disk, or ROM card or cartridge.

A removably mountable substantially planar viewing screen 13 is large enough to cover the video display area of the monitor 7. The screen 13 and monitor 7 can be provided with complimentary attachment devices 14 by which the screen can be fixedly mounted over the display on the monitor 7 and separated at will. The attachment devices can include strips or patches of hooked and looped plastic wires, e.g., as sold under the trademark Velcro. The complementary patches or strips can be cemented onto the monitor 7 and screen 13 in the borders surrounding the respective viewing areas. The attachment devices 14 are preferably arranged asymmetrically so that the screen 13 can only be placed on the monitor 7 in a single orientation. Thus the attachment device 14 serves as a position index for the screen as well as having a fastening function.

The screen 13 needn't be provided with any fastening device and can, instead, be held in place in front of the video display area of the monitor 7. Instead of using a position reference index on the monitor 7 such as is provided by the fastening devices 14, the program recorded on the diskette 11 can include steps for drawing an index on the video display of the monitor 7. This enables use of a screen 13 smaller in size than the size of the video display. For example, the program may draw on the video display, a small rectangle congruent to the viewing screen 13 as in FIG. 4. The screen 13 could then be held over the rectangle by the operator.

The viewing area of the screen 13 is partially transparent and is made up zones 15. Each zone 15 of the screen 13, has a light transmission characteristic different from that of its adjacent zone(s) 15. For example, adjacent zones 15 may have different colors so that light passing through the screen 13 is filtered with each zone 15 passing only light having the frequency(ies) corresponding to the color of the zone or a color component of the color of the zone. For example, a red zone will transmit only red light and will substantially filter out blue, green and combinations of blue and green having no red component. A magenta zone will transmit red and cyan light and colors having red and/or magenta components. A cyan zone will substantially block red light and transmit blue, green and combinations thereof. Each primary color in a zone 15 of a screen 13 will be transmitted while its complementary color will be attenuated by subtractive filtration.

Stored on the floppy diskette 11 is a computer program for performing a procedure. The program includes among its instructions, prefatory to the procedure, steps for writing to the display 7, an image of one or more characters, icon, pictures, words or other graphic representations at a predetermined location, and in a predetermined orientation. The primary image is composed of pixels, forming lines and/or areas, having predetermined colors and/or intensities at predetermined regions of the video display 7 corresponding to the zones 15 of the screen 13. The colors and intensities of the background images surrounding the primary image are also functions of the color and/or shading of the zones 15 of the screen 13.

The program recorded on the diskette 11 causes the colors and intensities used to form the primary foreground and secondary background images on the unfiltered display 7 to blend in a way that minimizes color and intensity contrast between the primary foreground and secondary background images so that there is no discernible demarcation between the two images. As a result, the characters, icons, pictures, words or other graphic representations which make up the foreground are unintelligible to the unaided eye of the user. Only when a screen 13 having a zonal distribution corresponding to the program on the diskette 11 is placed over the display 7 and properly positioned via the complementary indexing fasteners does the foreground become discernible from the background. In this configuration there is a correspondence between the disposition of the zones 15 and the underlying regions of the the display 7 so that light rays emitted from the display 7 at the foreground image contrast in color or intensity or both, with light rays emitted from the display 7 at the background image.

The foregoing scheme is illustrated in the following few examples of the many combinations and permutations of images, and their color and intensity distributions.

Referring now to FIG. 2 there is shown a screen 13' having three zones, 17, 19 and 21. Zone 17 transmits yellow light; zone 19 transmits magenta light, and zone 21 transmits cyan light. The instructions stored as a program on the diskette 11 cause the initial display 7' to have a central rectangular area 23 in which there is a foreground 25 made up of block letters spelling the word "SOFT" surrounded by a background. The area 23, including the foreground 25, is segmented into regions having different colors which appear to be randomly illuminated when viewed with the naked eye. However, the screen 13 corresponding to the diskette 11 has color filtering zones corresponding to the regions on the display 7' such that the colors of the zones overlying the regions within the word "SOFT" transmit the light emitted by the display 7' while the colors of the zones overlying the regions outside the word "SOFT", i.e., the background, attenuate the light emitted by the display 7' thereby rendering the image of the word "SOFT" visible.

Instructions on the display 7', or in an instruction manual accompanying the medium, e.g., floppy diskette 11, on which the program is stored, can admonish the user to type on the keyboard 5, the password that is visible on the central area 23 on the screen 13'. After the name is entered, a comparator within the CPU 3 can determine whether the user correctly identified the word. The programmed logic would then allow the procedure stored on the medium 11 to be performed. If the comparison should fail to confirm entry of the password, the program can be terminated or otherwise made to prevent the user from utilizing the procedure.

Referring now to FIG. 3, there is shown a screen 13" suitable for use with a monochrome display 7". The zones of the screen 13" are of different optical densities corresponding to the placement and intensity of the image programmed for display, in this case the integer "1". That is, those regions of the display 7" which will appear in the image of the integer "1" with high intensity should correspond to zones of the screen 13" having relatively high absorption or low transmission while those regions of the display 7" which will appear in the image of the integer "1" with low intensity should correspond to zones of the screen 13" having relatively low absorption or high transmission, all being balanced to achieve a constant intensity at the viewing side of the screen 13" having the appearance of a uniform shade of grey, while the zones covering the background attenuate the emitted light so as to present an image viewed through the screen 13" which contrasts with the foreground image, thereby enabling the user to distinguish the image, which in the example of FIG. 3 is the numeral 1. The images of the foreground and background are broken up into small regions of varying intensity thereby preventing the foreground image to be distinguished from the background.

Figure 4:
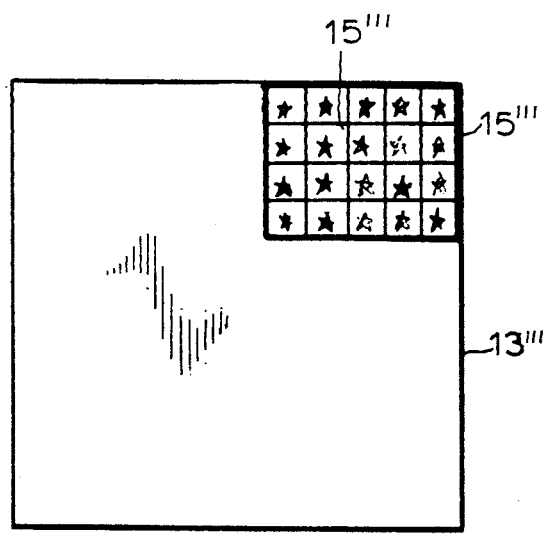
FIG. 4 is a plan view of a part of the apparatus of a third preferred embodiment of the invention.

Referring now to FIG. 4, there is shown a screen 13''' in which the coded zones 15''' are in the upper right corner. A matrix of four rows and five columns of asterisks, in a visible index frame drawn on the display, having regions of colors and/or intensity corresponding to the zones 15''' is used to reveal anywhere from one to 20 asterisks while the others remain camouflaged. The user must enter the correct number of asterisks via the keyboard 5 to run the programmed procedure.

Referring to FIG. 5, there is shown a screen 13'''' in which the coded zones 15'''' are arranged in a three by three matrix of nine integers. All but one of the integers is camouflaged by the color distributions throughout the regions occupied by the integers and the background. When the display 7'''' is viewed through the screen 13'''', only one of the numbers is rendered visible. The user is required to enter that number to begin the procedure.

Figure 6:
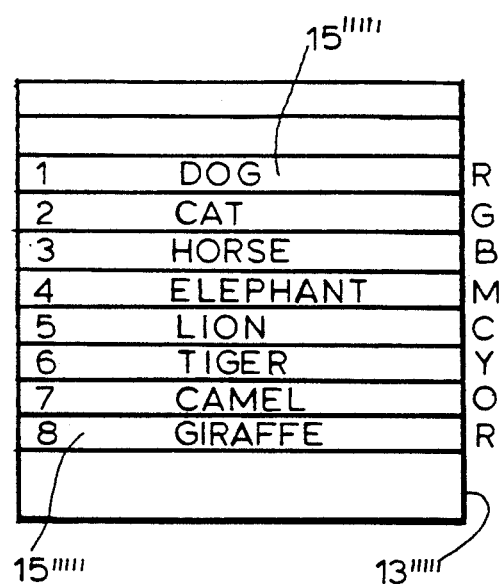
FIG. 6 is a plan view of a part of the apparatus of a fifth preferred embodiment of the invention.

Referring to FIG. 6, there is shown a screen 13''''' in which the coded zones 15''''' are arranged in horizontal rows each of which has a number followed by the name of an animal. The user must enter the number corresponding to the name of the animal which forms the foreground most heavily contrasted with its background. Rows 1-8 are respectively red, green, blue, magenta, cyan, yellow, orange and red again. In order to make choice 4 the one that allows the procedure to begin, the overlying zone is magenta and each of the letters in "ELEPHANT" is red, blue, magenta, or other colors having mostly red and blue components. The letters used to form the remaining animal designations are preferably complementary to the colors of the corresponding overlying zones. For example, in the first term, "DOG", the D is blue and the 0 and G are green. The red zone will substantially absorb all of the light rays corresponding to these letters. Similarly, the letters of the word "CAT" can all be red, or blue, or red and blue, thus being absorbed by the overlying green zone. All of the animal names are displayed in letters having colors which are largely attenuated by their respective overlying zones on the screen 13''''', except for the fourth. Upon seeing the word "ELEPHANT" standing out from the hidden animal names, the user knows to enter the corresponding number "4" to start the procedure.

Figure 7:
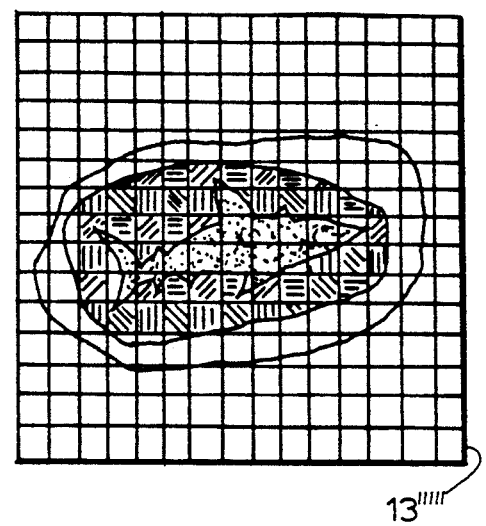
FIG. 7 is a plan view of a part of the apparatus of a sixth preferred embodiment of the invention.

Still another arrangement for the invention is shown in FIG. 7. There, a foreground graphic representation of a shark is hidden by a camouflaged multi-color or multi-intensity display which makes it blend with the background. Viewing through a corresponding colored and/or shaded screen 13'''''' reveals the shark. The user can then respond to the command: "In order to begin, enter the name of the creature shown on the screen."

The instructions programmed on the media 11 can provide for a large number of tests for the user so that each time the program is started, a different number, name, or other representation must be entered. A random number generator dependent on an external event, e.g., clock time, may be included in the software for ensuring that the user does not have a reasonable opportunity to make several guesses of the answer to a multiple choice question.

The invention has utility for use with color-blind users. Apparent intensity to a color-blind user may be controlled by varying image intensity and optical density of the screen zones 15. It may also be controlled by using colored images with colors screens to control image intensity. For example, a filtered image made up of adjacent red and green regions may confound a viewer with normal vision while presenting a homogenous image of a uniform shade of gray to the color-blind viewer.

It is to be appreciated that the foregoing is a description of several preferred embodiments of the invention to which many other variations and modifications may be made without departing from the spirit and scope of the invention. For example, the invention may be used to selectively allow viewing of a video recording, e.g., on a VCR. It may provide access to a bank automatic teller machine. It can be used to open a door to a building or garage. The invention can be used to provide selective access to virtually any instrumentality or facility. The number of combinations and permutations of color and intensity variation and of zone number and placement is virtually limitless within the scope of the invention.

What is claimed is:

1. In an interactive video system having a central processing means, a machine readable medium on which there are stored indicia of information, a reading means operatively connected to said central processing means for converting said indicia into video signals representative of said information, said reading means and central processing means being mutually responsive, a video display operatively connected to said central processing means for displaying said information, and an input means operatively connected to said central processing means, said video display being additionally responsive to said input means, the improvement comprising a partially transparent viewing screen having first and second laterally displaced zones, said first zone having a light transmission characteristic with a magnitude different from the magnitude of said light transmission characteristic in said second zone, complementary indexing means on said video display and said viewing screen for fixedly positioning said viewing screen with respect to said video display with at least part of each of said zones covering said video display for enabling viewing of a first predetermined region of said video display through said first zone of said viewing screen and a second predetermined region of said video display through said second zone of said viewing screen, said machine readable medium indicia being related to the disposition of said first and second zones on said viewing filter for enhancing the perceived contrast between an image displayed by said video display and viewed after transmission through said viewing screen relative to its surrounding background.

2. An interactive video system according to claim 1 wherein the light characteristic is the frequency and said first and second zones are of different colors.

3. An interactive video system according to claim 1 wherein the light characteristic is the intensity and said first and second zones are of different colors.

4. An interactive video system according to claim 1 wherein light characteristic is the intensity and said first and second zones are of different optical densities.

5. An interactive video system according to claim 1 wherein said indicia are arranged to present a video representation of an object and surrounding background formed by pixels each of which has a color predetermined as a function of its location on said video display and the color of the corresponding zone on said viewing screen.

6. An interactive video system according to claim 1 wherein said indicia are arranged to present a video representation of text and surrounding background formed by pixels each of which has a color predetermined as a function of its location on said video display and the color of the corresponding zone on said viewing screen.

7. An interactive video system according to claim 1 wherein said indicia are arranged to present a video representation of groups text formed by pixels each pixel having a color predetermined as a function of its location on said video display and the color of the corresponding zone on said viewing screen.

8. An interactive video system according to claim 1 wherein said indicia are arranged to present a video representation of a plurality of symbols and surrounding background formed by pixels each of which has a color predetermined as a function of its location on said video display and the color of the corresponding zone on said viewing screen.

9. A method for restricting viewing of a video display of information recorded in a medium comprising storing on said medium, a foreground image superimposed on a background image, said images comprising pixels having predetermined light characteristics such that said foreground and background images are indistinguishable when directly viewed;

displaying said images on a video display responsive to said medium, and placing over said display a partially transparent viewing screen having first and second laterally displaced zones, said first zone having a light transmission characteristic with a magnitude different from the magnitude of said light transmission characteristic in said second zone.

10. A method according to claim 9 further comprising mounting said screen over said display in a predetermined orientation.

11. A method according to claim 9 further comprising viewing said display through said screen.

12. A method according to claim 9 further comprising displaying said information by making a response which is a function of said images transmitted by said screen.

* * * * *